US009394088B2

(12) United States Patent
Bellmore et al.

(10) Patent No.: US 9,394,088 B2
(45) Date of Patent: Jul. 19, 2016

(54) TAP FOR A FLEXIBLE PACKAGE HAVING A DOSING DISPENSER

(71) Applicant: Scholle Corporation, Irvine, CA (US)

(72) Inventors: David Bellmore, DeWitt, MI (US); Chris Murray, Chicago, IL (US); Eric Wehrli, Oswego, IL (US)

(73) Assignee: Scholle IPN Corporation, Northlake, IL (US)

( * ) Notice: Subject to any disclaimer, the term of this patent is extended or adjusted under 35 U.S.C. 154(b) by 16 days.

(21) Appl. No.: 14/463,042

(22) Filed: Aug. 19, 2014

(65) Prior Publication Data

US 2015/0048111 A1 Feb. 19, 2015

Related U.S. Application Data (60) Provisional application No. 61/867,226, filed on Aug. 19, 2013.

(51) Int. Cl.
*B65D 47/24* (2006.01)
*B65D 77/06* (2006.01)
*G01F 11/02* (2006.01)

(52) U.S. Cl.
CPC .......... *B65D 47/247* (2013.01); *B65D 77/068* (2013.01); *G01F 11/028* (2013.01)

(58) Field of Classification Search
CPC ..... B65D 47/247; B65D 77/068; G01F 11/00
USPC .......... 222/321.1, 321.7–321.9, 383.1, 383.3, 222/105, 509
See application file for complete search history.

(56) References Cited

U.S. PATENT DOCUMENTS

| 3,062,416 | A  | * | 11/1962 | Cooprider | B05B 11/0064 137/539 |
| 4,991,746 | A  | * | 2/1991 | Schultz | A47K 5/1205 222/153.13 |
| 6,644,367 | B1 |   | 11/2003 | Savage et al. | |
| 6,736,289 | B2 | * | 5/2004 | Wolf | B65D 77/067 222/105 |
| 7,334,702 | B2 | * | 2/2008 | Cunningham | B65D 75/58 222/1 |
| 7,757,897 | B2 | * | 7/2010 | Young | B05B 11/3001 222/153.13 |
| 8,967,430 | B2 | * | 3/2015 | Wrigley | B67D 3/045 222/105 |
| 2002/0100772 | A1 | * | 8/2002 | Bonningue | B05B 11/0016 222/321.2 |
| 2009/0078721 | A1 | * | 3/2009 | Hoffman | B65D 77/06 222/1 |
| 2014/0076927 | A1 | * | 3/2014 | Brooks | B65D 77/067 222/105 |

FOREIGN PATENT DOCUMENTS

CH   670805 A5   7/1989
SU   1696805 A1   12/1991
WO   02/29297 A1   4/2002

* cited by examiner

*Primary Examiner* — Donnell Long
(74) *Attorney, Agent, or Firm* — The Watson I.P. Group, PLC; Jovan N. Jovanovic; Vladan M. Vasiljevic (57) ABSTRACT

A tap for a flexible package having a dosing dispenser. The tap can be coupled to a spout of a flexible bag (such as the type that is provided for bag in box packaging). The tap permits the application of metered doses from the flexible bag. As the flexible bag is emptied, the flexible bag collapses, as the dosing dispenser generally prohibits the passage of air back into the flexible bag when the flowable material is emptied therefrom.

5 Claims, 8 Drawing Sheets

TAP FOR A FLEXIBLE PACKAGE HAVING A DOSING DISPENSER

CROSS-REFERENCE TO RELATED APPLICATION

This application claims priority from U.S. Provisional Application Ser. No. 61/867,226 entitled Tap For A Flexible Package Having A Dosing Dispenser, filed Aug. 19, 2013, the entire specification of which is hereby incorporated by reference in its entirety.

BACKGROUND OF THE DISCLOSURE

1. Field of the Disclosure

The invention relates in general to taps for flexible packaging (including bag in box packaging), and more particularly to a tap for flexible packaging that includes a dosing dispenser configured to dispense a particular desired quantity upon each actuation.

2. Background Art

The use of flexible packaging for storage and dispensing of flowable material is well known in the art. Generally, such flexible packaging may include a dispensing tap. Often such dispensing taps can be triggered into either an open or a closed configuration. When open, a full flow is passed through the tap. When closed, no flowable material is allowed to pass.

There are some taps which provide the ability to adjust the rate of the flow when the tap is in the open position. Thus, one may adjust the flow rate so as to either selectively increase or decrease the flow from the flexible bag.

There is an advantage to facilitate the passage of a particular quantity of flowable material from a flexible bag. One such solution is disclosed in U.S. Pat. No. 7,789,269 issued to Prichard. That solution includes a plurality of one way valves which direct fluid through a path, and includes a piercing probe member.

The present disclosure provides for the metering or dosing of dispensing from a flexible bag in a manner that is advantageous over the prior art.

SUMMARY OF THE DISCLOSURE

The disclosure is directed to a dispensing tap for a bag in box package having an outer rigid container and an inner flexible bag. The dispensing tap comprises a plug portion, a tap body portion and a metered dispensing assembly. The plug portion is attachable to a spout of an inner flexible bag. The tap body portion extends away from the plug portion. The tap body portion includes a central cavity extending therethrough and into the plug portion. The metered dispensing assembly extends through the central cavity of the plug portion. The metered dispensing assembly comprises a cylinder, a piston a return spring, an upper valve and a lower valve. The cylinder has a first end and a second end, with an inlet at the first end. The piston is slidably and sealingly positionable within the cylinder at the second end thereof. The piston includes an inlet and an outlet. A dispenser actuator is provided. The piston is slidable between a first position wherein the inlet of the piston is proximate the second end of the cylinder, which defines a first volume of the cylinder, and a second position. In the second position the inlet of the piston is moved toward the first end of the cylinder, thereby defining a second volume of the cylinder which is smaller than the first volume of the cylinder. The return spring biases the piston into the first position. The lower valve is associated with the cylinder proximate the first end thereof. The lower valve precludes the egress of flowable material positioned within the cylinder upon direction of the piston toward the second position. The upper valve is associated with the piston. The upper valve precludes ingress of material positioned between the upper valve and the outlet of the piston from entering the cylinder upon direction of the piston toward the first position.

In some configurations, the cylinder of the metered dispensing assembly is fixedly coupled to the tap body portion.

In some configurations, the plug portion and the tap body portion are integrally molded. The cylinder of the metered dispensing assembly is integrally molded therewith.

In some configurations, the tap body portion includes a pair of opposing side flanges positioned at a distal end thereof. The central cavity extends therebetween.

In some configurations, the dispenser actuator, when the piston is in the second position, is positioned between the opposing side flanges at the distal end of the tap body, to, in turn, allow for a user to grasp behind the opposing side flanges while depressing the dispenser actuator.

In some configurations, the inlet of the piston and the outlet of the piston are substantially perpendicular to each other, such that the piston is directed inwardly from the distal end of the tap body toward the second position.

In some configurations, the dispenser actuator extends out of the central cavity, and the outlet of the piston extends beyond the side of the tap body portion. A channel is configured to allow the outlet of the piston to traverse thereacross upon movement between the first and second position.

In some configurations, the metered dispensing assembly is releasably coupled to the tap body portion.

In some configurations, the tap body portion includes coupling member. The metered dispensing assembly includes a coupling member which is configured to matingly engage with the coupling member of the tap body portion.

In some configurations, the tap body portion includes a cage extending about and defining a central cavity. The cage includes a pair of opposing side flanges extending outwardly therefrom.

In some configurations, the cage is defined by an upstanding wall having at least one opening to provide access to the central bore proximate the coupling member.

In some configurations, a base flange is positioned between the tap body portion and the tap plug portion.

In some configurations, the cage further includes an opening configured to allow a space for the outlet of the piston upon extending of the same to the second position.

In another aspect of the disclosure, the disclosure is directed to a bag in box packaging having a rigid outer container and an inner flexible bag. The inner flexible bag includes a plurality of panels that are coupled together by way of seals to define a fluid tight cavity. A spout is coupled thereto, providing fluid communication with the fluid tight cavity. The dispensing tap, of the type described above and hereinbelow is attachable to the spout.

BRIEF DESCRIPTION OF THE DRAWINGS

The disclosure will now be described with reference to the drawings wherein:

FIG. 5b of the drawings is a cross-sectional schematic view of a metered dispensing assembly configured for use in association with the adapter of the present disclosure shown in FIG. 5a;

FIG. 6b of the drawings is a cross-sectional view of the embodiment of the tap shown in FIG. 6a.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1A:
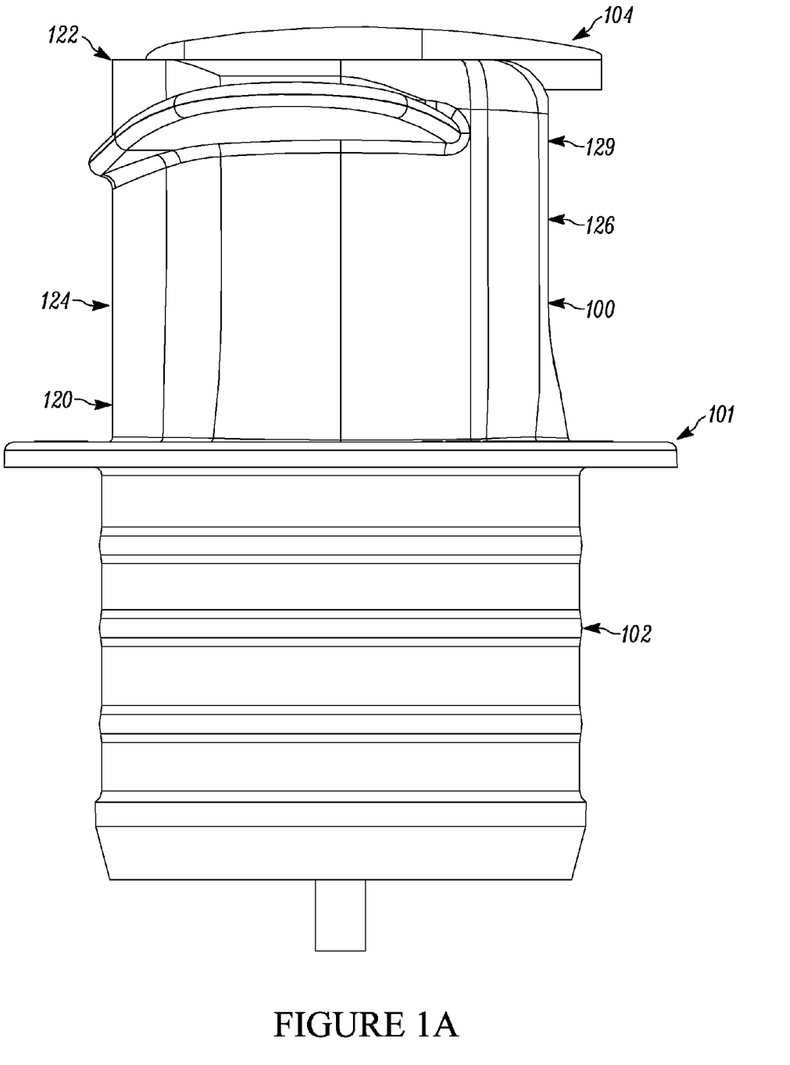
FIG. 1a is a side elevational view of the tap dispenser of the present disclosure.
Figure 1B:
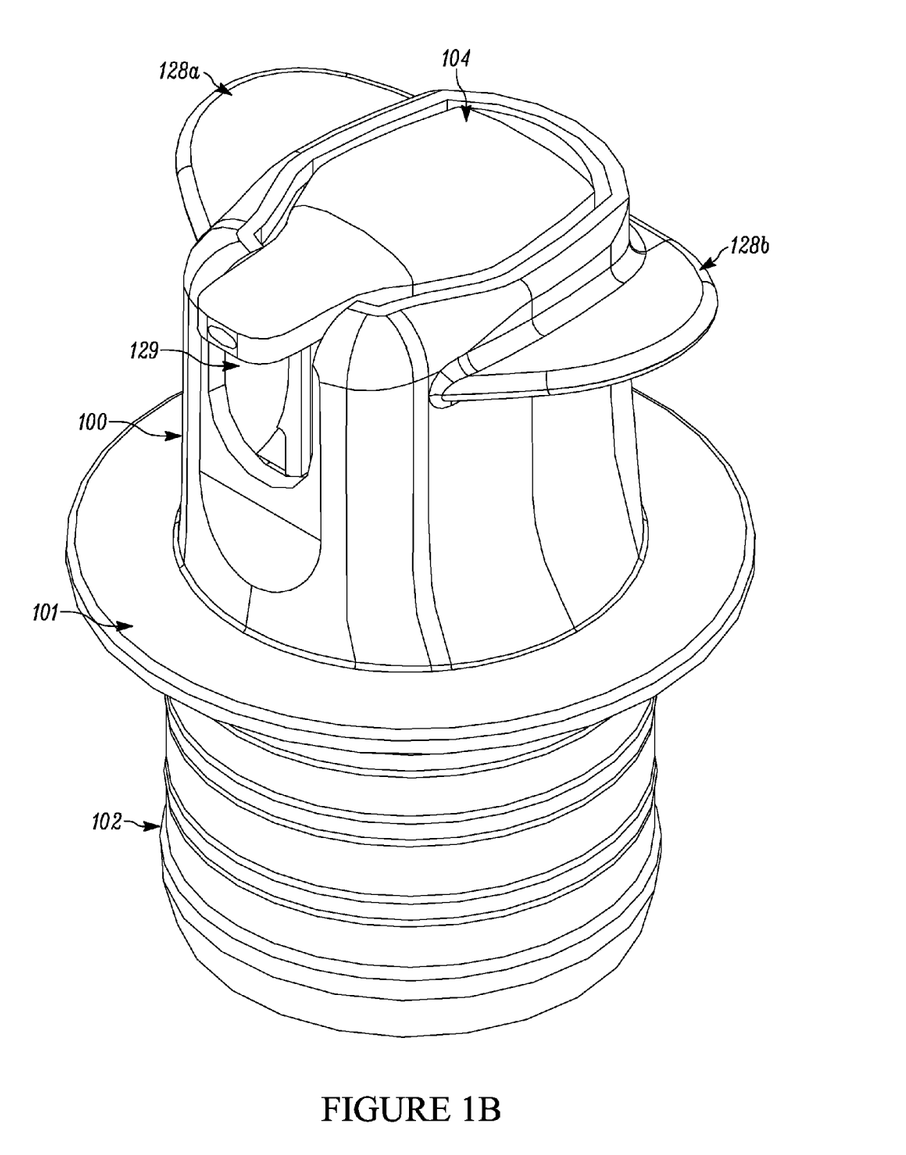
FIG. 1b is a perspective view of the tap dispenser of the present disclosure.
Figure 1C:
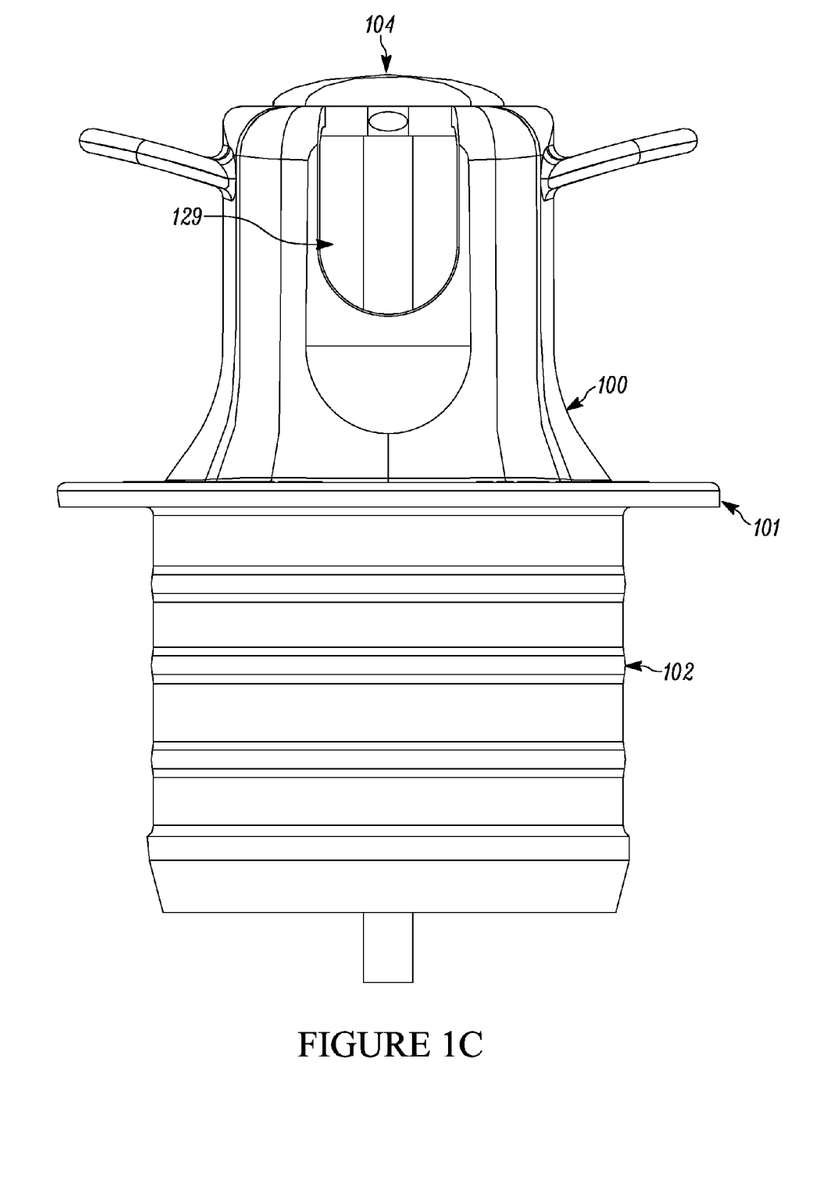
FIG. 1c is a front plan view of the tap dispenser of the present disclosure.

Referring now to the drawings and in particular to FIG. 1, the dispensing tap is shown generally at 100. The tap 100 is configured for attachment onto a bag 12 having a spout 40. The bags can be used alone, or in combination with outer rigid containers, such as container 16. One such use is in association with bag-in-box packaging. In such applications, the bags may be used to store and dispense flowable material, including, but not limited to liquids, gels, syrups, such as soft drink syrup, beverages, such as wine, purees among other flowable material. It is contemplated that such a flowable material may comprise any number of different viscosities, and may include a solids content. The foregoing examples of flowable material are meant to be illustrative, and not deemed to be limiting.

Figure 2:
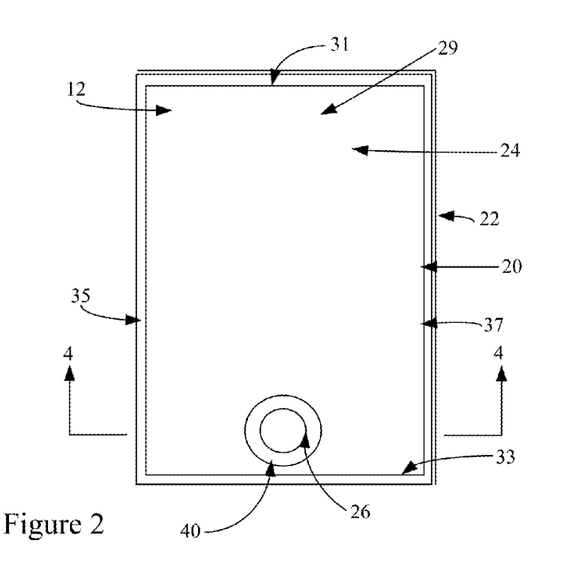
FIG. 2 of the drawings is a perspective view of a flexible bag of the present disclosure.
Figure 4:
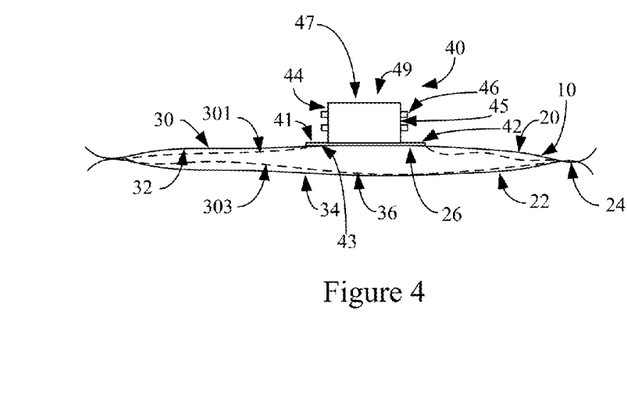
FIG. 4 of the drawings is a cross-sectional view of a flexible bag of the present disclosure, showing, in particular, the structure of the spout and the flexible bag, taken generally about lines 4-4 of FIG. 2.

One illustrative bag of the type contemplated for use is shown in FIGS. 2 and 4 as comprising a commonly known pillow type bag. Such a bag includes front panel 20 and back panel 22. Front panel 20 includes outer surface 30 and inner surface 32. The back panel 22 includes outer surface 34 and inner surface 36. The front and back panel are positioned in an overlying orientation so that the inner surfaces face each other.

The panels are then coupled together by way of seals 24. In the case of a pillow type container, the seals 24 include a top seal 31, bottom seal 33, first side seal 35 and second side seal 37. The seals are generally perpendicular to adjacent seals and parallel to opposing seals to generally define a square or rectangular configuration, thereby defining a generally square or rectangular cavity 29. The seals may be formed through the application of heat, or through other procedures, including, but not limited to RF welding, ultrasonic welding, or adhesive, among others. The disclosure is not limited to any particular manner of attachment of the panels.

For many pillow type containers, an opening 26 is provided through the front panel 20 proximate, but spaced apart from the bottom seal 33. A spout 40 can be coupled thereto in sealed engagement. In certain embodiments, multiple spouts may be provided, one, for example, for dispensing, and one for filling. In other embodiments, spouts may be positioned along the seals so as to extend between the panels. The film is configured for use in association with multiple configurations of spouts, as well as in embodiments that do not require spouts.

One type of spout is shown in FIG. 4 as comprising a base flange 42, and upstanding wall 44 extending from the base flange. The base flange includes top surface 41 and bottom surface 43 opposite top surface 41. Generally the base flange is substantially planar and generally perpendicular to the upstanding wall 44. Either one of the top and bottom surfaces may be sealed to the front panel about opening 26, through a heat seal. Of course, other sealing methods, such as those identified above may be utilized in place of heat sealing.

The upstanding wall includes an outer surface 45 which includes grasping flanges, such as grasping flange 46 extending about the outer surface. Generally, these grasping flanges are disposed in a spaced apart orientation along the outer surface, generally parallel to the base flange 42. Of course, other configurations are likewise contemplated. The upstanding wall defines a passageway, which is generally of a circular configuration, terminating at opening 49 spaced distally from the base flange 42. Of course, other cross-sectional configurations are contemplated, and the disclosure is not limited to any particular configuration of the spout.

Figure 3:
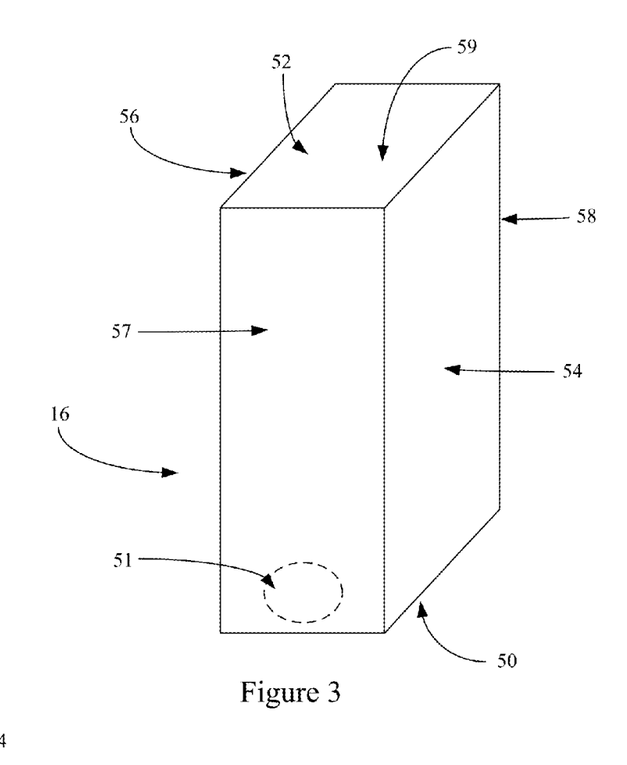
FIG. 3 of the drawings is a perspective view of an outer box within which the flexible bag of FIG. 2 may be positioned.

It will be understood that such a bag may be positioned within an outer carton, such as an outer box 16 which is shown in FIG. 3. The outer box includes a bottom wall 50, top wall 52, first side wall 54, second side wall 56, front wall 57 and back wall 58. The outer box that is shown in the figures comprises a rectangular cubic configuration. Of course, such a configuration is merely exemplary, and not to be deemed limiting. It will be understood that other containers, such as those having fewer or greater number of sides (i.e., a hexagonal or octagonal box having a plurality of sides along with a bottom and top wall are contemplated as well). In some embodiments, one of the walls, and in the embodiment shown, the front wall 57, may include an opening 51 which provides access to the cavity 59, and the bag therein. In other embodiments, it may be necessary to remove one of the walls to gain access to cavity 59. It is contemplated that the outer carton comprise a paperboard material, such as a corrugated paperboard. Of course, other materials are likewise contemplated for use, including, but not limited to, other paperboard materials, polymer materials, including bio-polymers, and the like.

It will be understood that while a pillow type bag is shown, the film is not limited to use therewith. For example, the bag may comprise a gusseted bag wherein four panels are coupled together to form a generally rectangular shaped bag. One such configuration is shown in U.S. Pat. No. 5,788,121 issued to Sasaki et al. Another such configuration is shown in U.S. Pat. No. 6,783,277 issued to Edwards. The foregoing patents are incorporated by reference in their entirety.

It will further be understood that a single ply pillow type bag is shown in FIG. 1 (with optional dashes shown in FIG. 4 for an additional inner ply 301, 303), while other configurations are contemplated. For example, a multi-ply bag, pillow, or otherwise, is likewise contemplated for use. For example, such a container may include multiple plies, sharing common seals, or having separate individual seals. It will be understood that each ply may comprise a different wall construction, and it is contemplated that the multiple plies may comprise co-extrusions, laminates or a combination of the structures.

The dispensing tap 100 is shown in FIG. 1 as comprising tap body portion 100, plug portion 102 and metered dispensing assembly 104 separated by base flange 101. The tap body portion 100 and plug portion 102 are generally integrally molded, although not required to be integrally molded. The metered dispensing assembly 104 extends through the tap body portion and into the plug portion. Generally, the tap body comprises a molded polymer member, such as a polypropylene, polyethylene, polystyrene material, among other materials. Of course, other materials are contemplated for use.

The tap body portion 100 includes proximal end 120, distal end 122 and defines an elongated central bore 124. The tap body portion includes an outer surface 126. At the distal end 122, opposing side flanges 128a, 128b extend like wings on either side of the outer surface. A central cavity 129 is defined between the opposing side flanges 128a, 128b. A passageway extends from the central cavity 129 through to the elongated central bore 124.

The dispensing assembly comprises a pump dispenser. One such pump dispenser is shown in U.S. Pat. No. 8,261,949 issued to Oden et al, the entire specification of which is hereby incorporated by reference. Such pumps are known in the art, as providing a metered dose each time that the pump is depressed. On the return stroke, which is typically powered by a return spring, a new dose is drawn from the larger container and placed into a cylinder. Upon the next depression, this cylinder is emptied through the dispenser head. At such time the cycle is repeated.

It will be understood that for application to the present disclosure, modifications are required to the pump. In particular, and as shown in the photograph attached at FIG. 5b, the pump is to be of the type that precludes the passage of air back into the container. That is, generally, pumps are associated with rigid packaging, wherein it is necessary to replace the volume of fluid that has been dispensed with air or another gas. In this case, with flexible packaging, it is desirable to prohibit the replacement of the missing fluid. In such a case, the flexible package cavity volume is merely reduced. Additionally, there is no return of contaminants into the flexible bag, thereby rendering use in an aseptic environment acceptable. One manner of achieving such a pump, is through the use of a return valve that precludes the passage of outside air back into the flexible package as the pump is returning to its initial configuration.

More particularly, such a pump 104 (which is similar in componentry to the pump utilized in the embodiment of FIG. 1), includes cylinder 130, piston 132, lower valve 134, upper valve 136 and return spring 138. Preferably, the cylinder 130 is fixed to the dispensing tap or to the outer cage member or to the spout. The cylinder 130 includes inlet 140, outlet 141 and extends from first end 142 to second end 143. The inlet 140 is in fluid communication with the flowable material that is positioned within the bag 12. The cylinder may include an extension or stem member which extends further into the bag 12.

Piston 132 includes inlet 144, outlet 145, dispenser actuator 146, that extends from first end 147 to second end 148. The piston is positioned so as to extend through the outlet 141 of the cylinder and to sealingly engage therewith. The dispenser actuator, as is shown in FIG. 1 extends within the central cavity of the dispensing tap 100 and generally matches the side flange position. As such, a user can grasp the side flanges from behind with his or her fingers while depressing the dispenser actuator with the thumb, regardless of the orientation of the container, the spout and the dispensing tap.

The lower valve 134, which is positionable proximate the first end of the cylinder, precludes the passage of flowable material back into the bag during dispensing. The upper valve 136, which is positioned within the piston, precludes the return of any contaminants, material, flowable material or the like back into the cylinder. The return spring directs the dispenser actuator (and piston) back into an initial position, ready for depression and actuation by a user.

In operation, as the user depresses the dispenser actuator, and the piston moves within the cylinder, the volume of the cylinder is reduced. Thus, any flowable material that is within the cylinder is forced out of the cylinder. The lower valve 134 precludes the return of the flowable material to the bag, thus, the flowable material is directed through the piston, and eventually through the outlet 145 thereof. It will be understood that the piston and cylinder can be designed so as to deliver a precise predetermined amount of flowable material for each actuation of the dispenser actuator.

When the end of travel is reached, the user releases the dispenser actuator. At such time, the return spring redirects the piston back to the initial configuration. At the same time, the volume of the cylinder is increasing, essentially pulling a vacuum. The upper valve 136 is closed by such a vacuum, whereas the lower valve 134 opens to allow flowable material to enter into the cylinder. At such time, the cycle is ready to be repeated. Advantageously, air or other outside contaminants are not allowed to pass into the bag, due to the lower valve and upper valve configurations. As such, the flowable material within the bag remains free of contaminants.

In other words a piston slidably and sealingly positionable within the cylinder at the second end thereof. The piston includes an inlet and an outlet, with a dispenser actuator. The piston is slidable between a first position wherein the inlet of the piston is proximate the second end of the cylinder, thereby defining a first volume of the cylinder, and a second position wherein the inlet of the piston is moved toward the first end of the cylinder, thereby defining a second volume of the cylinder which is smaller than the first volume of the cylinder.

It will be understood that the dispenser actuator extends out of the central cavity so as to be readily accessible, although that is not required. Additionally, in the embodiment shown, the outlet of the piston extends beyond the side of the tap body portion. A channel 173 is configured to allow the outlet of the piston to traverse thereacross upon movement between the first and second position. That is, the outlet has a channel 173 along which to move as it is actuated.

As explained above, it is contemplated that such a pump dispenser is integrated with the tap body portion such that the dispensing head is positioned within the central cavity 129 between the opposing side flanges. In such an instance, the travel of the dispensing head is within the central cavity with communication to the internal working components through the passageway and into the central bore 124. In such a configuration, a compact yet, user actuatable configuration is defined which can be actuated by a single hand of a user.

Figure 5A:
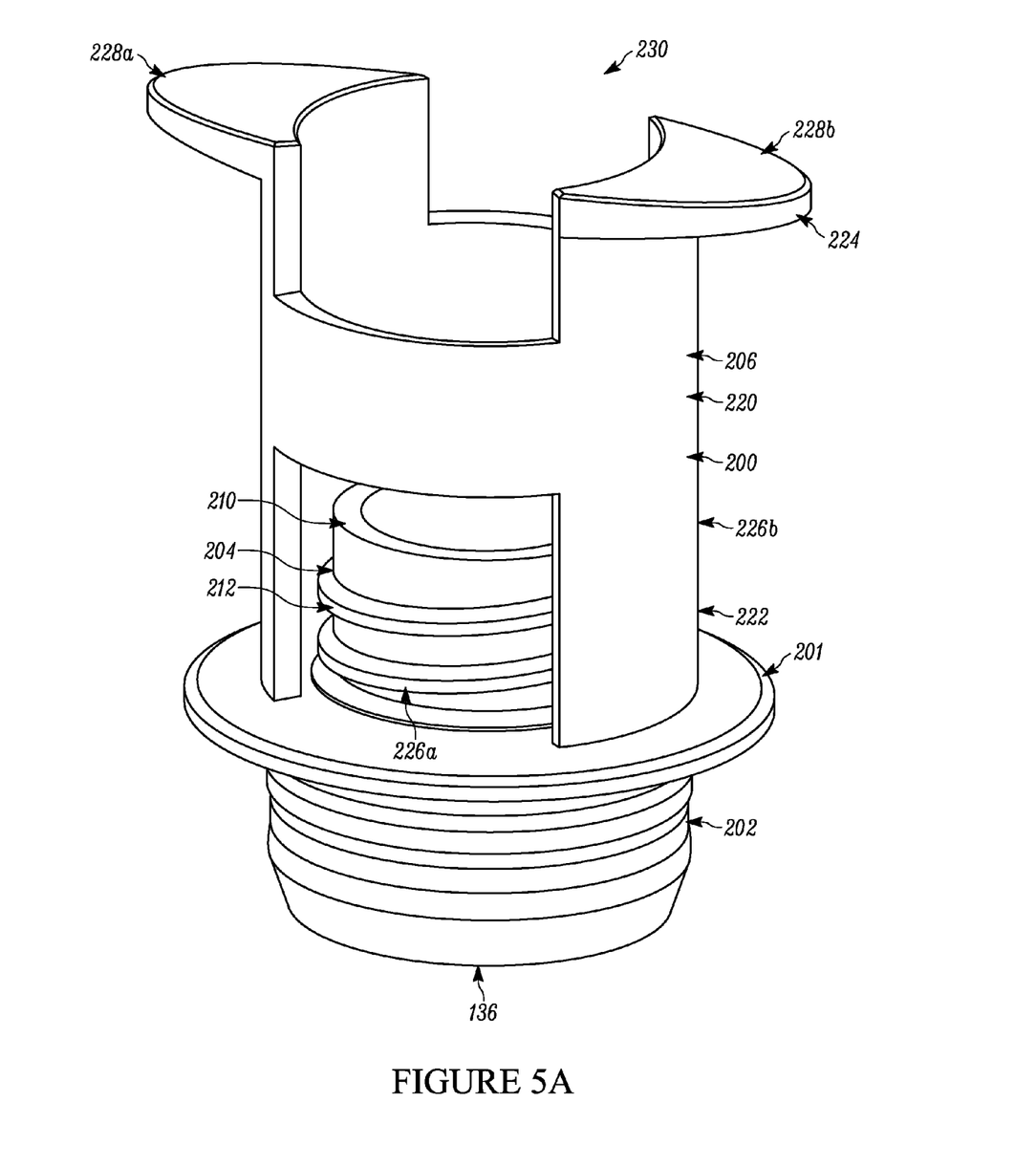
FIG. 5a of the drawings is a perspective view of the tap adapter of the present disclosure.
Figure 5B:
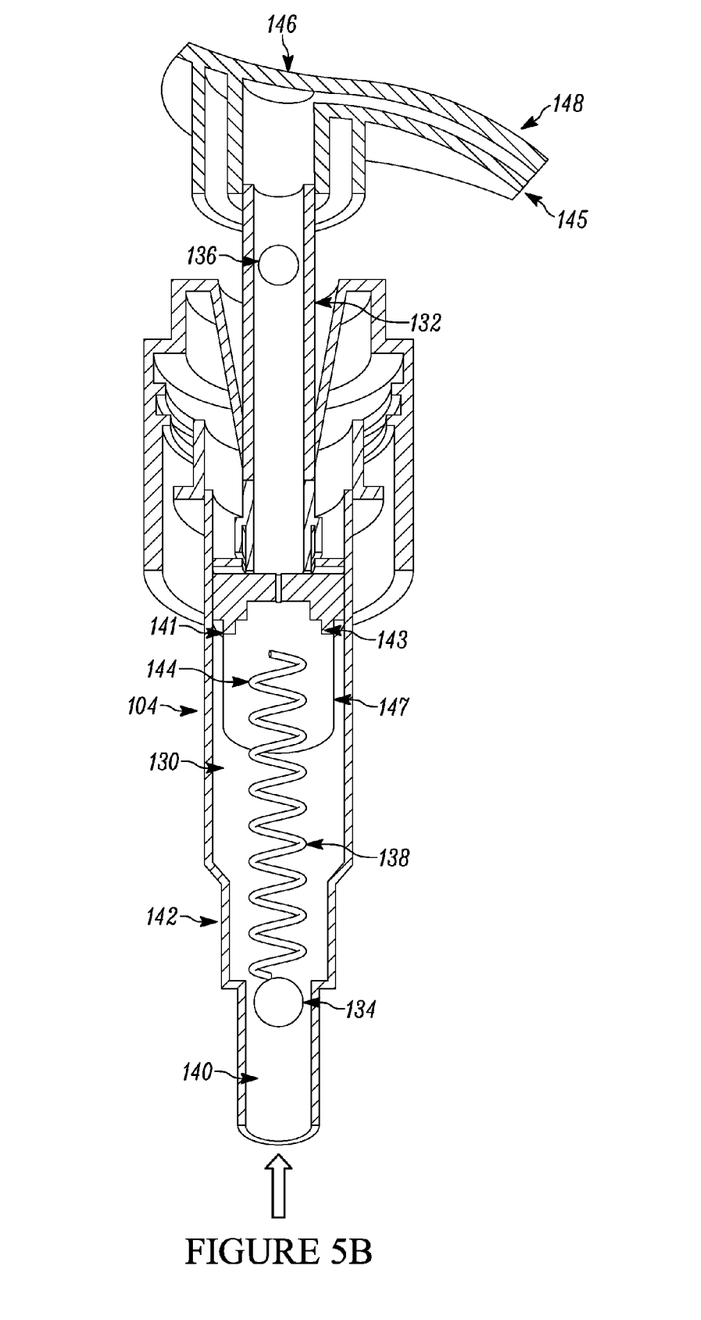

In another embodiment of the disclosure, and with reference to FIGS. 5a and 5b, in the place of an integrally molded tap and metered dispensing assembly, an adapter may be configured, to which, a pump dispenser can be releasably coupled. In particular, such a tap adapter comprises body portion 200 and plug portion 202. The plug portion 202 is substantially identical to the plug portion 102 of FIGS. 1a through 1c, and base flange 201 is substantially identical to base flange 101.

The body portion 200 comprises a central passage member 204 and outer cage member 206. The central passage member includes outer surface 210 and coupling member 212. The central passage member extends outwardly from the base flange of the dispensing tap and is in fluid communication with the opening 136 of the plug portion (and in fluid communication with the cavity of the flexible bag). The coupling member 212, in this case, a threadform, extends along the outer surface 210 of the member 204.

The outer cage member 206 extends upwardly from the base flange of the dispensing tap and encircles the central passage member, being axially spaced apart therefrom, whereby defining a central bore 230. The outer cage member includes an upstanding wall 220 that extends from a proximal end 222 at the base flange to a distal end 224. The upstanding wall 220 extends outwardly beyond the central passage member. At or near the distal end 224, opposing flanges 228a, 228b extend outwardly from the upstanding wall. Openings, such as openings 226a, 226b are positioned on opposing sides of each other so as to provide access to the central bore 230 proximate the outer surface 210 of the central passage member.

In such an embodiment, a hand pump having a threaded flange (as is shown in FIG. 5b) can be inserted through the central passage member until the flange of the hand pump engages the coupling member 212 on the outer surface 210 thereof. Once engaged, the user can grasp the outside of the threaded flange of the hand pump through the openings 226a, 226b so as to rotate the threaded flange relative to the central passage member. Such relative movement engages the mating threadforms of the threaded flange and the central passage member, engaging the two components together. Once fully engaged, the two components are in a fluid-tight engagement. The pump is then ready for use.

Figure 6A:
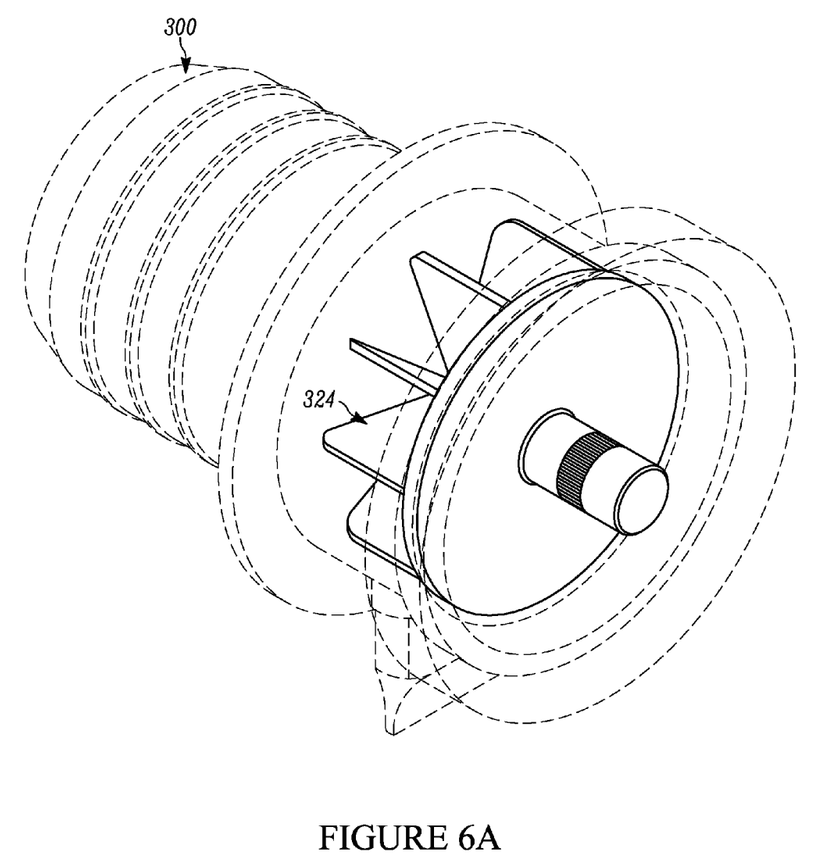
FIG. 6a of the drawings is a perspective view of another embodiment of the tap.
Figure 6B:
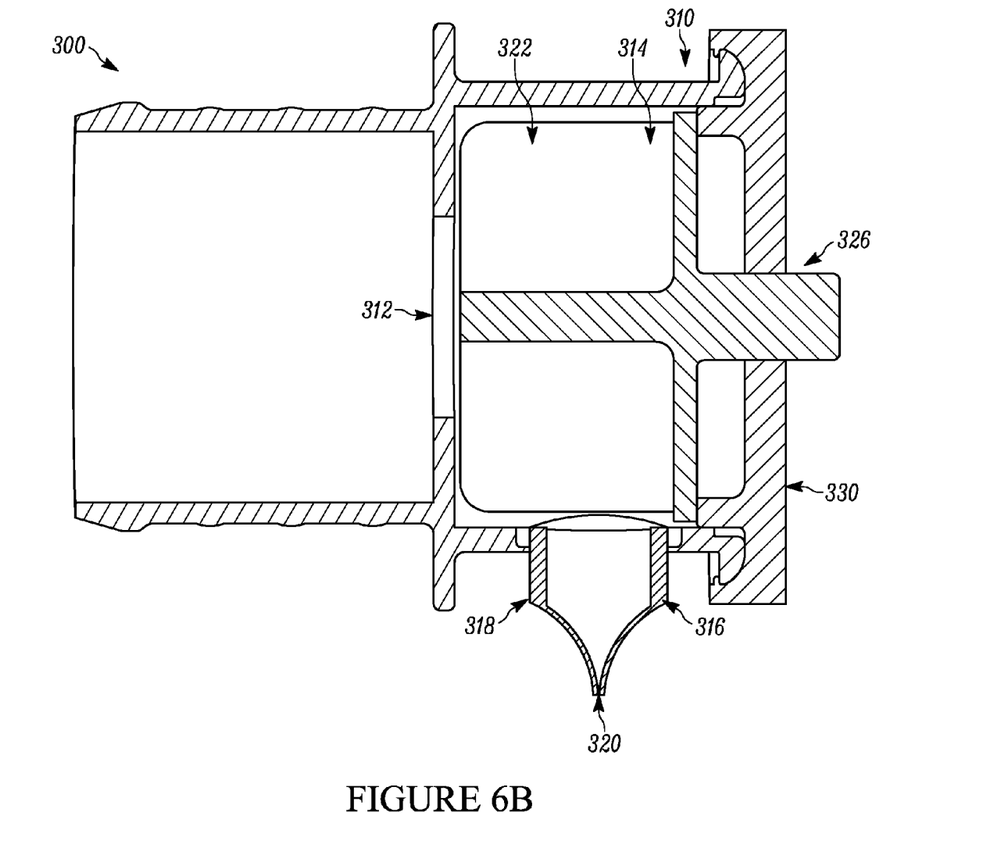

In yet another configuration that is contemplated, as is shown in FIGS. 6a through 6b, the tap body portion 300 includes a cylindrical wall portion 310 that is larger than an inlet 312 defined between the portion and the body portion along the base flange. The cylindrical wall portion defines a cylindrical cavity 314 therewithin.

An annular opening 316 is provided through the cylindrical wall. A duckbill valve, or the like 318 having an outlet 320 can be positioned to control flow through this opening.

An impeller 322 is placed within the cylindrical wall portion and is configured for rotation within the cylindrical wall portion. A plurality of impeller vanes 324 are axially spaced apart and extend axially from a central location. An actuator 326 extends from the impeller outwardly and out of the cylindrical wall portion. A cap 330 is provided that can cover the cylindrical wall portion trapping the impeller therewithin. An opening is provided on the cap to permit for the passage of the actuator therethrough.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A dispensing tap for a bag in box package having an outer rigid container and an inner flexible bag, the dispensing tap comprising:
   a plug portion attachable to a spout of an inner flexible bag;
   a tap body portion extending away from the plug portion, the tap body portion including a central cavity extending therethrough and into the plug portion;
   a metered dispensing assembly extending through the central cavity of the plug portion, the metered dispensing assembly comprising:
      a cylinder having a first end and a second end, with an inlet at the first end;
      a piston slidably and sealingly positionable within the cylinder at the second end thereof, the piston including an inlet and an outlet, with a dispenser actuator, the piston slidable between a first position wherein the inlet of the piston is proximate the second end of the cylinder, thereby defining a first volume of the cylinder, to a second position wherein the inlet of the piston is moved toward the first end of the cylinder, thereby defining a second volume of the cylinder which is smaller than the first volume of the cylinder;
      a return spring biasing the piston into the first position;
      a lower valve associated with the cylinder proximate a first end thereof, the lower valve precluding the egress of a flowable material positioned within the cylinder upon direction of the piston toward the second position; and
      an upper valve associated with the piston, the upper valve precluding the ingress of material positioned between the upper valve and the outlet of the piston from entering the cylinder upon direction of the piston toward the first position,
   wherein the cylinder of the metered dispensing assembly is fixedly coupled to the tap body portion,
   wherein the plug portion and the tap body portion are integrally molded, with the cylinder of the metered dispensing assembly integrally molded therewith,
   wherein the tap body portion includes a pair of opposing side flanges positioned at a distal end thereof, with the central cavity extending therebetween,
   wherein the dispenser actuator, when the piston is in the second position, is positioned between the opposing side flanges at the distal end of the tap body, to, in turn, allow for a user to grasp behind the opposing side flanges while depressing the dispenser actuator, and
   wherein the dispenser actuator extends out of the central cavity, and the outlet of the piston extends beyond the side of the tap body portion, with a channel configured to allow the outlet of the piston to traverse thereacross upon movement between the first and second position.

2. The dispensing tap of claim 1 wherein the inlet of the piston and the outlet of the piston are substantially perpendicular to each other, such that the piston is directed inwardly from the distal end of the tap body toward the second position.

3. A dispensing tap for a bag in box package having an outer rigid container and an inner flexible bag, the dispensing tap comprising:
   a plug portion attachable to a spout of an inner flexible bag;
   a tap body portion extending away from the plug portion, the tap body portion including a central cavity extending therethrough and into the plug portion;
   a metered dispensing assembly extending through the central cavity of the plug portion, the metered dispensing assembly comprising:
      a cylinder having a first end and a second end, with an inlet at the first end;
      a piston slidably and sealingly positionable within the cylinder at the second end thereof, the piston including an inlet and an outlet, with a dispenser actuator, the piston slidable between a first position wherein the inlet of the piston is proximate the second end of the cylinder, thereby defining a first volume of the cylinder, to a second position wherein the inlet of the piston is moved toward the first end of the cylinder, thereby defining a second volume of the cylinder which is smaller than the first volume of the cylinder;

a return spring biasing the piston into the first position;

a lower valve associated with the cylinder proximate a first end thereof, the lower valve precluding the egress of a flowable material positioned within the cylinder upon direction of the piston toward the second position; and an upper valve associated with the piston, the upper valve precluding the ingress of material positioned between the upper valve and the outlet of the piston from entering the cylinder upon direction of the piston toward the first position, wherein the metered dispensing assembly is releasably coupled to the tap body portion, wherein the tap body portion includes coupling member, and the metered dispensing assembly includes a coupling member which is configured to matingly engage with the coupling member of the tap body portion, wherein the tap body portion includes a cage extending about and defining a central cavity, the cage including a pair of opposing side flanges extending outwardly therefrom, and wherein the cage is defined by an upstanding wall having at least one opening to provide access to a central bore proximate the coupling member.

4. The dispensing tap of claim 3 wherein a base flange is positioned between the tap body portion and the tap plug portion.

5. A dispensing tap for a bag in box package having an outer rigid container and an inner flexible bag, the dispensing tap comprising:

a plug portion attachable to a spout of an inner flexible bag;

a tap body portion extending away from the plug portion, the tap body portion including a central cavity extending therethrough and into the plug portion;

a metered dispensing assembly extending through the central cavity of the plug portion, the metered dispensing assembly comprising:

a cylinder having a first end and a second end, with an inlet at the first end;

a piston slidably and sealingly positionable within the cylinder at the second end thereof, the piston including an inlet and an outlet, with a dispenser actuator, the piston slidable between a first position wherein the inlet of the piston is proximate the second end of the cylinder, thereby defining a first volume of the cylinder, to a second position wherein the inlet of the piston is moved toward the first end of the cylinder, thereby defining a second volume of the cylinder which is smaller than the first volume of the cylinder;

a return spring biasing the piston into the first position;

a lower valve associated with the cylinder proximate a first end thereof, the lower valve precluding the egress of a flowable material positioned within the cylinder upon direction of the piston toward the second position; and an upper valve associated with the piston, the upper valve precluding the ingress of material positioned between the upper valve and the outlet of the piston from entering the cylinder upon direction of the piston toward the first position, wherein the metered dispensing assembly is releasably coupled to the tap body portion, wherein the tap body portion includes coupling member, and the metered dispensing assembly includes a coupling member which is configured to matingly engage with the coupling member of the tap body portion, wherein the tap body portion includes a cage extending about and defining a central cavity, the cage including a pair of opposing side flanges extending outwardly therefrom, and wherein the cage further includes an opening configured to allow a space for the outlet of the piston upon extending of the same to the second position.

* * * * *